(Model.)
J. D. CROCKETT.
MUZZLE.
No. 260,948.    Patented July 11, 1882.
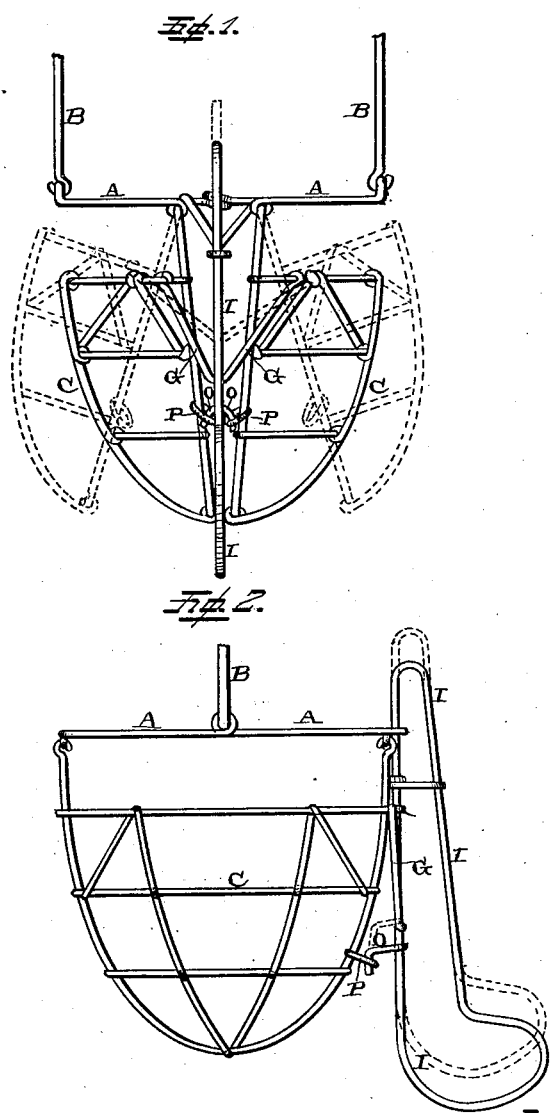
Witnesses
W. W. Mortimer
W. H. Kirn
Inventor
J. D. Crockett,
per
F. A. Lehmann
Atty.

UNITED STATES PATENT OFFICE.

JAMES D. CROCKETT, OF RIPLEY, MISSISSIPPI.

MUZZLE.

SPECIFICATION forming part of Letters Patent No. 260,948, dated July 11, 1882.

Application filed March 17, 1882. (Model.)

*To all whom it may concern:*

Be it known that I, J. D. CROCKETT, of Ripley, in the county of Tippah and State of Mississippi, have invented certain new and useful Improvements in Muzzles; and I do hereby declare the following to be a full, clear, and exact description of the invention, such as will enable others skilled in the art to which it pertains to make and use it, reference being had to the accompanying drawings, which form part of this specification.

My invention relates to an improvement in muzzles; and it consists in dividing the lower portion of the muzzle in two parts, and hinging or pivoting these two parts upon the upper portion in such a manner that the downward pressure of the animal's head will cause the lower end of the operating-rod to press against the ground, trough, or other similar object, and the upward sliding movement of this rod will cause the two movable portions of the muzzle to open outward, so that the horse can eat as freely as though it had no muzzle on, as will be more fully described hereinafter.

The object of my invention is to provide a grazing-muzzle, by the use of which animals may be pastured in any field where crops are growing, and which will prevent them from damaging the crop by eating it. This muzzle can be used while plowing to keep stock from biting the growing crop, and also to prevent colts and calves from sucking, or cows from sucking themselves, and at the same time not interfering with their grazing.

Figure 1 is a front elevation of my invention, showing the parts of the muzzle closed together in solid lines and opened outward in dotted lines. Fig. 2 is a side elevation.

A represents the upper portion of the muzzle, which may be of any desired width, and which is to be attached to the animal's head by means of the cord or strap B. I do not limit myself to any particular construction of this part of the muzzle, though it is here shown of two rings or bands, which are united together by means of wires, which are wrapped back and forth around them. These bands are held stationary in regard to each other by any suitable means which may be preferred.

Hinged or otherwise loosely attached to the other edge of the upper portion of the muzzle are the two parts C, which are intended to inclose the animal's mouth. Between the lower edges of the stationary part of the muzzle and the upper edge of these two lower parts there is left enough space to allow the two lower parts to open outward a suitable distance before the edges of the two parts come in contact. When the two parts are closed, as shown in solid lines in Fig. 1, the animal is prevented from either sucking itself or another animal or from eating. In order to enable the animal to graze freely, or to eat out of a trough, or from the ground, or off any other object, the two movable parts of the muzzle are connected by means of the rods G to the vertically-moving rod I. This vertically-moving rod projects a suitable distance below the lower ends of the two moving parts of the muzzle, so that this rod will come in contact with the ground or other object before the animal's mouth comes in contact with it, and as this rod slides freely back and forth through guides formed for it in the upper stationary part of the muzzle the slightest pressure downward of the animal's head causes the rod to rise upward, and at the same time, by means of the connecting-rods attached thereto, push the two hinged portions of the muzzle outward, as shown in dotted lines in Fig. 1. Projecting inward from this operating-rod are the two hooks O, which serve to catch in the loops or staples P when the rod is at its lowest point, and thus lock the two parts of the muzzle together, so that neither side can be opened outward by any movement of the animal's head.

This muzzle is specially intended to prevent animals, while cultivating crops, from biting off the tops of the growing plants, to prevent young animals from sucking, and cows from sucking themselves, while it does not interfere with their grazing and eating out of a trough.

Having thus described my invention, I claim—

1. The combination of a muzzle composed of two hinged or pivoted parts, and an operating-rod which extends below the muzzle, and which is connected with the two movable parts, so as to open them outward, substantially as described.

2. The combination of the part A, which is fastened to the animal's head by a cord or strap, B, with the two parts of the muzzle, which are connected thereto, and operating-rod for opening the two parts of the muzzle, substantially as set forth.

3. The combination of the muzzle composed of two hinged or pivoted parts, an operating-rod provided with suitable locking-hooks, and suitable loops or staples, which are secured to the movable parts, so that they can be locked together, substantially as specified.

In testimony whereof I affix my signature in presence of two witnesses.

JAMES DAVIS CROCKETT.

Witnesses:
W. W. ROBINSON,
ED. W. SIMPSON.